United States Patent [19]

Sato

[11] Patent Number: 5,127,673
[45] Date of Patent: Jul. 7, 1992

[54] CASSETTE ACCOMMODATING METHOD AND INDEX CARD FOR CASSETTE CASE

[75] Inventor: Makoto Sato, Kanagawa, Japan

[73] Assignee: Fuji Photo Film Co., Ltd., Kanagawa, Japan

[21] Appl. No.: 652,727

[22] Filed: Feb. 8, 1991

[30] Foreign Application Priority Data

Feb. 13, 1990 [JP] Japan .................................. 2-29700

[51] Int. Cl.⁵ .............................................. B42D 1/00
[52] U.S. Cl. ........................................ 281/2; 281/5; 281/51; 283/62; 283/117
[58] Field of Search ............... 281/2, 5, 51; 283/147, 283/62, 61

[56] References Cited

FOREIGN PATENT DOCUMENTS 0182721 11/1985 European Pat. Off. .
0269159 11/1987 European Pat. Off. .

Primary Examiner—Paul A. Bell
Attorney, Agent, or Firm—Sughrue, Mion, Zinn, Macpeak & Seas

[57] ABSTRACT

A method for accommodating a magnetic tape cassette and an index card in a book-case type cassette storage case into which the magnetic tape cassette is inserted while being moved in one direction so as to be accommodated therein. An index card is provided which is made of a rectangular sheet material. An end portion of the card is bent so that the portion is brought into planar contact with an inner surface of a rear wall of the cassette storage case when the index card is inserted in the storage case. The bending is performed along a bending line in one end portion of the index card in such a manner that, in the direction of thickness of the cassette storage case, the height ($h_1$) of the bent portion is smaller than the height ($H_1$) of an internal space in the cassette storage case when the index card is inserted into the cassette storage case, and the bent portion including a wide portion defined by a distance ($w_1$) between the bending line and the outer edge of the bent portion, which distance is larger than the height ($H_1$) of the internal space in the cassette storage case.

12 Claims, 4 Drawing Sheets

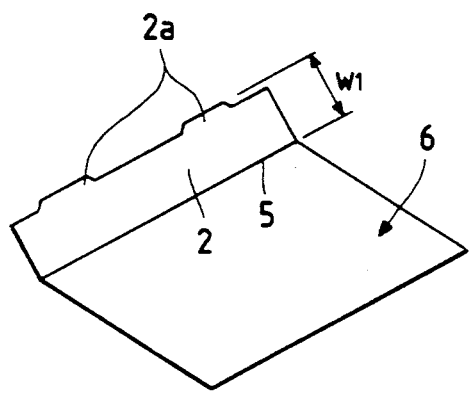
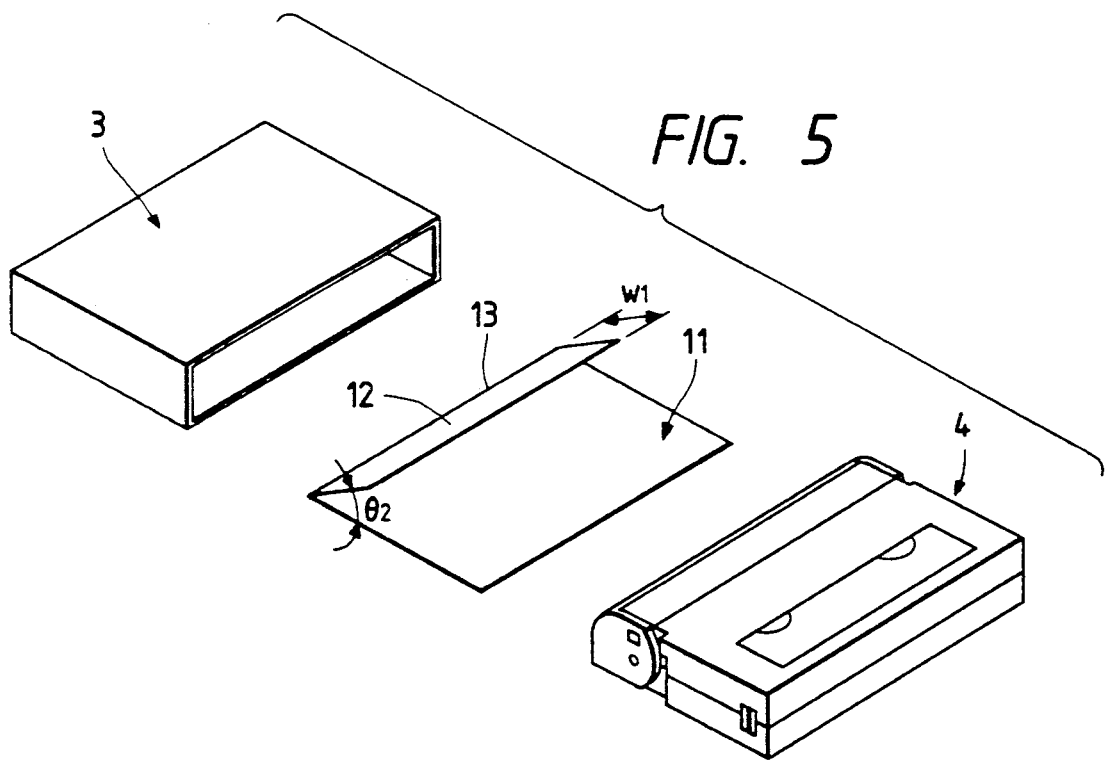

CASSETTE ACCOMMODATING METHOD AND INDEX CARD FOR CASSETTE CASE

BACKGROUND OF THE INVENTION

The present invention relates to a method for accommodating a magnetic tape cassette in a cassette storage case, and also to an index card for use in a cassette storage case, particularly such a method and index card used with a book-case type cassette storage case for a video tape cassette.

Audio or video magnetic tape cassettes are, in general, kept in a cassette storage case when not in use. The cassette storage case is used to protect the cassette from external shocks and to prevent the entrance of dust into the cassette. Particularly in the case of a high density magnetic recording tape employed for an audio or video signal recording operation, it is essential to prevent the entrance of dust into the cassette because the adherence of dust to the tape may cause troubles such as signal dropout.

Examples of a cassette storage case of this type include a plastic case formed by injection molding having a lid with a pocket into which the cassette is inserted and a casing coupled pivotally to the lid so as to be swingable like a door, and a so-called "book-case" type cassette storage case formed, for instance, by first forming a plate having a predetermined configuration by blanking, and bending and assembling the resin plate thus formed using an adhesive. The book-case type cassette storage case is superior to the ordinary plastic case in that the width in the direction of cassette thickness can be reduced.

The cassette storage case is provided with an index card on which necessary data relating to the recorded content of the cassette stored therein can be recorded. The index card is constructed as indicated at 14 in FIG. 11, and is placed in the case as shown in FIG. 10.

The index card 14 set in the book-case type cassette storage case 3 is by bending the index card 14 along a bending line 16 in one end portion so that the resultant index card is L-shaped in section with an erect wall 15. The erect wall 15 is to be set on the inner surface of the rear wall of the cassette storage case 3. Therefore, necessary data such as a title recorded on the erect wall 15 can be read through the transparent rear wall of the cassette storage case 3.

The reason for the employment of the index card 14 bent in such a manner that it is L-shaped in section is as follows: If the index card were bent in such a manner that it is U-shaped in section, that is, if it is so bent that it is brought in contact with the inner surface 3b of the bottom wall, the inner surfaces 3a of the rear wall, and the inner surface 3c of the top wall of the cassette storage case 3, then the index card will cover the top window of the magnetic tape cassette 4, thus making it impossible to visually detect the amount of tape remaining in the cassette.

The index card may by bending one end portion of the index card in such a manner that it is U-shaped in section as in the case of an index card provided for a compact cassette tape storage case. However, the index card thus formed is disadvantageous in the case where a magnetic tape cassette to be stored in the cassette storage case has an upper lid, as in the case of an 8-mm video tape cassette. That is, the front edge of the bent portion of the index card, since it extends in the widthwise direction of the inner surface 3c of the top wall of the cassette, is liable to be caught by the upper lid, thus making it rather difficult to insert the cassette into the case.

In the index card 14 bent along the bending line 16 in its one end portion in such a manner that it is L-shaped in section, the distance $w_2$ between the bending line 16 and the edge is made shorter than the height $H_1$ of the space in the cassette storage case, that is, the height $h_2$ of the erect wall 15 is made shorter than the height $H_1$ of the space in the cassette storage case 3, whereby the index card 14 can be inserted into the cassette storage case 3 with ease. Hence, the index card 14 in the cassette storage case 3 applies no force to the inner surfaces of the case 3. As a result, when no magnetic tape cassette 4 is in the cassette storage case, the index card 14 is liable to slip down in the case.

In the case of the index card whose one end portion is bent U-shaped in section as in the case of a compact cassette tape accommodating case, the force of opening the bent portion of the index card acts on the inner surfaces of the cassette storage case in the direction of thickness of the latter at all times. Hence, even after the magnetic tape cassette has been extracted from the case, the frictional force between the index card and the inner surfaces prevents the index card from falling out of the case. On the other hand, the above-described index card 14 applies no force to the inner walls of the case, and therefore it can drop out of the case readily when the magnetic tape cassette 4 is extracted from the case.

On the other hand, the cassette storage case 3 suffers from difficulties in that, since its cassette inserting opening is open at all times, dust can easily enter the case, and the magnetic tape cassette can fall out of the case when the case is being handled and can thus be damaged.

SUMMARY OF THE INVENTION

Accordingly, an object of the invention is to eliminate the above-described difficulties accompanying a conventional cassette storage case and its index card.

More specifically, an object of the invention is to provide an index card which can be effectively used for a book-case type cassette storage case, and a magnetic tape cassette accommodating method by which the index card can be readily set in the case.

The foregoing and other objects of the invention have been achieved by the provision of a cassette accommodating method in which an index card formed of a rectangular sheet material which is to be set in a bookcase type cassette storage case and into which a magnetic tape cassette is inserted into the case while being moved in one direction so as to be accommodated therein. The index card has a bent portion formed so as to be brought into planar contact with the inner surface of the rear wall of the cassette storage case by bending the index card along a bending line in one end portion of the index card in such a manner that, in the direction of thickness of the cassette storage case, the height ($h_1$) of the bent portion is smaller than the height ($H_1$) of the internal space in the cassette storage case. The bent portion includes a wide portion defined by the distance ($w_1$) between the bending line and the outer edge of the bent portion, which distance is larger than the height ($H_1$) of the internal space in the cassette storage case. The index card is inserted into the cassette storage case with the bent portion pushed by the cassette into the case in such a manner that the wide portion is pushed against the inner wall of the rear wall of the cassette storage case by the front end of the magnetic tape cassette so as to be held bent between the inner walls of the top and bottom walls of the cassette storage case. The index card preferably has another bent portion which is formed by bending the other end portion of the card in such a manner as to provide a cover with an inserting piece which is adapted to close the opening of the cassette storage case.

The rise angle or fold angle ($\theta_1$ or $\theta_2$) which is formed when one end portion of the index card so as to provide the bent portion is preferably 45° to 80°.

BRIEF DESCRIPTION OF THE DRAWINGS

FIG. 4 is a perspective view showing a modification of the index card shown in FIGS. 1 through 3;

FIG. 5, and FIGS. 6 and 7 are respectively an exploded perspective view, and sectional views, with parts cut away, illustrating a magnetic tape cassette accommodating method and an index card of a second embodiment of the invention;

DESCRIPTION OF THE PREFERRED EMBODIMENTS

Preferred embodiments of the invention will be described with reference to the accompanying drawings.

Figure 1:
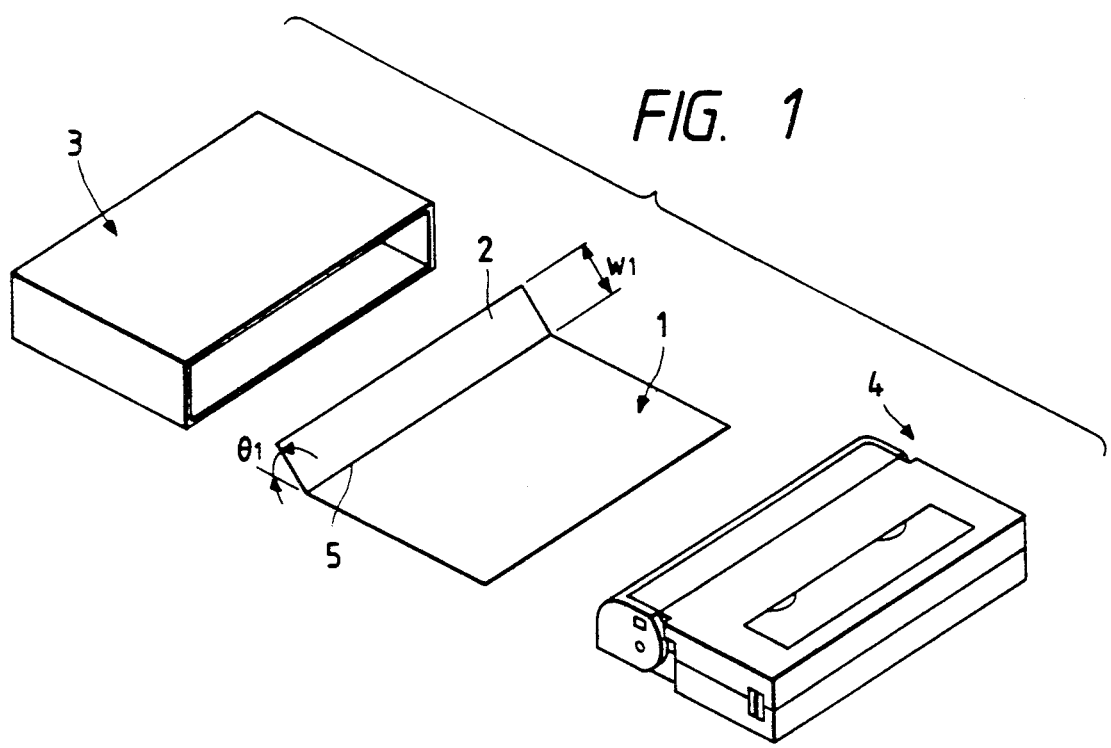
FIG. 1, and FIGS. 2 and 3 are respectively an exploded o perspective view, and sectional views, with parts cut away, illustrating a magnetic tape cassette accommodating method and an index card of a first embodiment of the invention.
Figure 2:
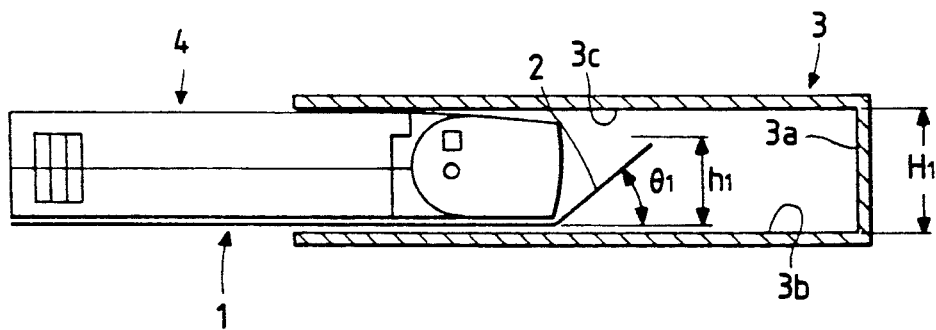
Figure 3:
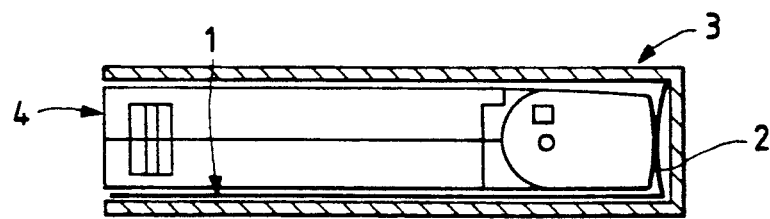

A first embodiment of the invention will be described wit reference to FIGS. 1, 2 and 3. A magnetic tape cassette 4 is inserted into a book-case type cassette storage case 3. The case 3 is manufactured according to a method in which a resin sheet having a predetermined configuration is formed by blanking, and the resin sheet thus formed is bent and assembled using adhesive into a book-case type cassette storage case.

An index card 1 to be set in the cassette storage case 3 will be described.

The index card 1 has a bent portion 2 which is to be brought into planar contact with the inner surface of the rear wall of the cassette storage case 3. The bent portion 2 is obtained by bending the index card 1 along a bending line 5 in one end portion in such a manner that the bent portion 2 forms a rise angle $\theta_1$ with respect to an extension of the remaining portion, and, in the direction of thickness of the cassette storage case 3, its height h is smaller than the height $H_1$ of the internal space in the cassette storage case. The bent portion 2 has a bending width, which is the distance $w_1$ between the bending line 5 and the edge of the bent portion 2, which is slightly larger than the aforementioned height $H_1$ of the internal space in the cassette storage case 3.

As described above, the bending width of the bent portion 2 of the index card 1 is larger than the height $H_1$ of the internal space in the cassette storage case 3, and the bent portion 2 forms the rise angle $\theta_1$ in such a manner that, in the cassette thickness direction, its height $h_1$ is smaller than the height $H_1$. Hence, the index card 1 can be smoothly inserted into the cassette storage case 3 while being slid along the inner surface of the bottom wall thereof.

When the magnetic tape cassette 4 and the index card 1 are nearly inserted into the cassette storage case 3, the edge of the bent portion 2 abuts against the inner surface 3a of the rear wall of the cassette storage case 3 and then slides along the inner surface 3a of the rear wall, and strikes against the corner of the inner surface 3a of the rear wall and the inner surface 3c of the top wall.

As described above, the bending width of the bent portion 2 is larger than the height $H_1$ of the internal space in the cassette storage case. Hence, as the magnetic tape cassette 4 is further inserted into the cassette storage case 3, the bent portion 2 is brought into planar contact with the inner surface 3a of the rear wall while being bent by the force of pushing the magnetic tape cassette, as shown in FIG. 3.

The bent portion 2 is held between the inner surface 3c of the top wall and the inner surface 3b of the bottom wall by its elastic force; that is, the index card 1 is prevented from falling out of the cassette storage case 3 unintentionally.

The configuration of the index card is not limited only to that which has been described above. That is, the index card may be modified as shown in FIG. 4. In this modification, the bent portion 2 includes wide portions 2a and 2a; that is, it has protrusions along its outer edge. It goes without saying that the bending width $w_1$ of the bent portion 2 including the protrusions 2a is larger than the height $H_1$ of the internal space in the cassette storage case as in the above-described index card.

Figure 6:
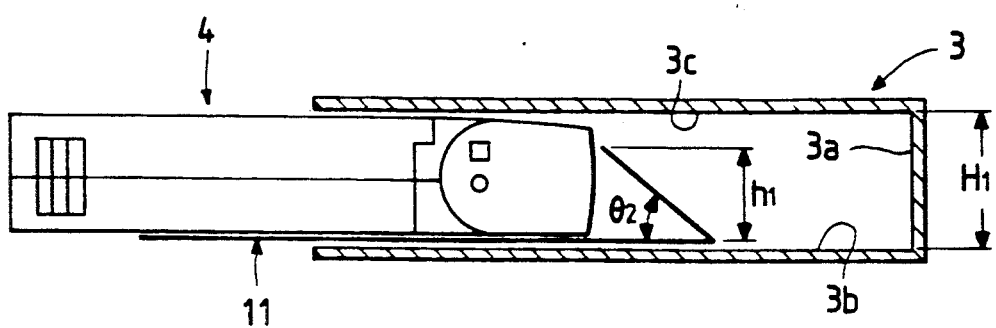

A second embodiment of the invention will be described with reference to FIGS. 5, 6 and 7.

An index card 11 has a bent portion 12 which is to be brought into planar contact with the inner surface of the rear wall of a cassette storage case 3 which is similar to the case of the above-described first embodiment. The bent portion 12 is obtained by bending the index card 11 along a bending line 13 in one end portion in such a manner that the bent portion 12 forms a fold angle $\theta_2$ with respect to the remaining portion of the index card 11, while, in the cassette thickness direction, its height $h_1$ is smaller than the height $H_1$ of the internal space of the cassette storage case 3, and the distance $w_1$ between the bending line 13 and the edge of the bent portion 12 is larger than the aforementioned height $H_1$.

That is, similarly as in the above-described index card 1, the bent portion 12 of the index card 11 has a bending width which is larger than the height $H_1$ of the internal space in the cassette storage case 3. However, it should be noted that, as described above, the bent portion 12 forms the angle $\theta_2$ with the remaining portion of the index card 11 determined so that, in the cassette thickness direction, its height $h_1$ is smaller than the heigh $H_1$ of the internal space in the cassette storage case 3. Hence, the index card 11 can be smoothly inserted into the cassette storage case 3 while being slid along the inner surface 3b of the bottom wall.

When the magnetic tape cassette 4 and the index card 11 are nearly inserted into the cassette storage case 3, the bending line 13 of the index card 11 abuts against the corner of the inner surface 3a of the rear wall and the inner surface 3b of the bottom wall of the cassette storage case 3.

Figure 7:
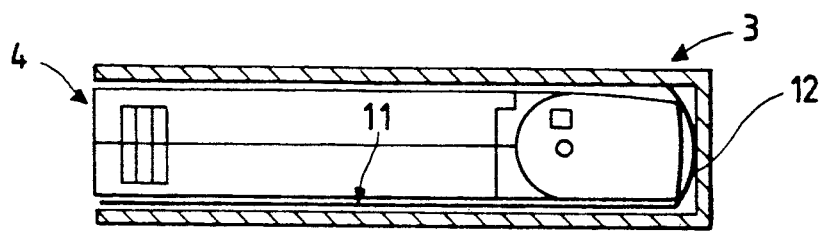

As the magnetic tape cassette 4 is further inserted into the cassette storage case 3, the bent portion 12 is brought into planar contact with the inner surface 3a of the rear wall while being bent by the force of pushing the magnetic tape cassette, as shown in FIG. 7.

Thus, the bent portion 12 is held between the inner surface 3c of the top wall and the inner surface 3b of the bottom wall by its elastic force; that is, the index card 11 is prevented from falling out of the cassette storage case 3 unintentionally.

If, in each of the above-described first and second embodiments of the invention, the speed of insertion of the magnetic tape cassette 4 into the cassette storage case 3 is reduced, then the bent portion (2 or 12) can be erected more readily by the force of pushing the magnetic tape cassette 4, and therefore the angle ($\theta_1$ or $\theta_2$) formed by the bent portion can be reduced. However, preferably the angle $\theta_1$ or $\theta_2$ is at least five (5) degrees, depending on the rigidity of the bend portion 2 or 12.

Subsequently, a third embodiment of the invention will be described with reference to FIGS. 8 and 9.

An index card 7 has a first bent portion 2 formed by bending its one end portion in an manner similar to the 15 above-described first and second embodiments, and a second bent portion formed by bending the other end portion towards the first bent portion in such a manner that the second bent portion provides a covering portion 8 with an inserting piece 9.

Figure 8:
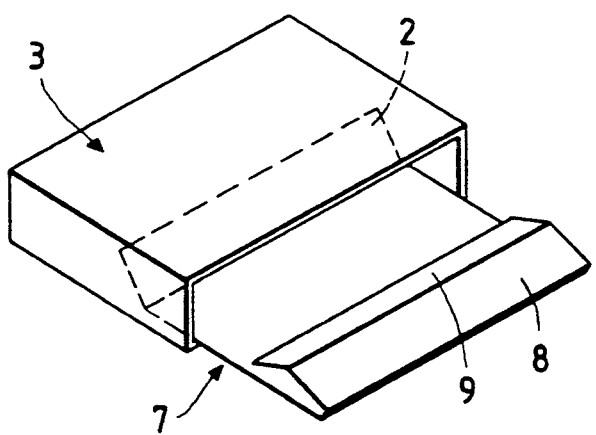
FIGS. 8 and 9 are a perspective view and a sectional view, with parts enlarged, illustrating a magnetic tape cassette accommodating method and an index card of a third embodiment of the invention.
Figure 9:
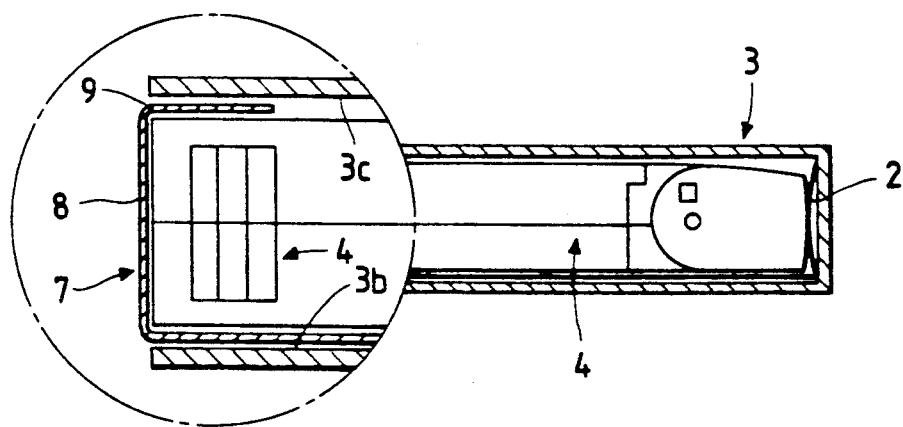
Figure 10:
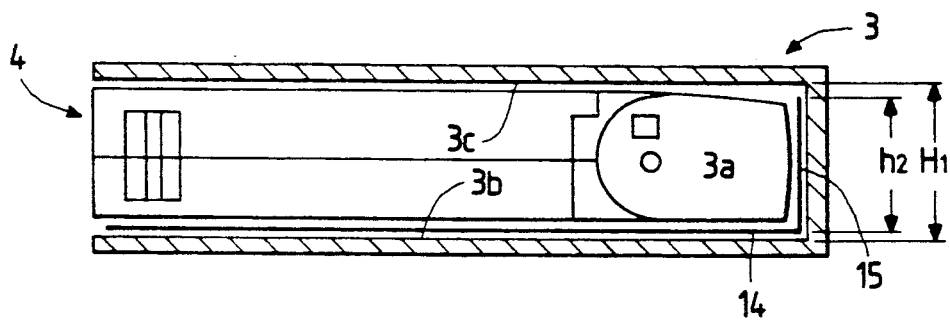
FIG. 10 is a sectional view, with parts cut away, showing a conventional index card set in a cassette storage. case.
Figure 11:
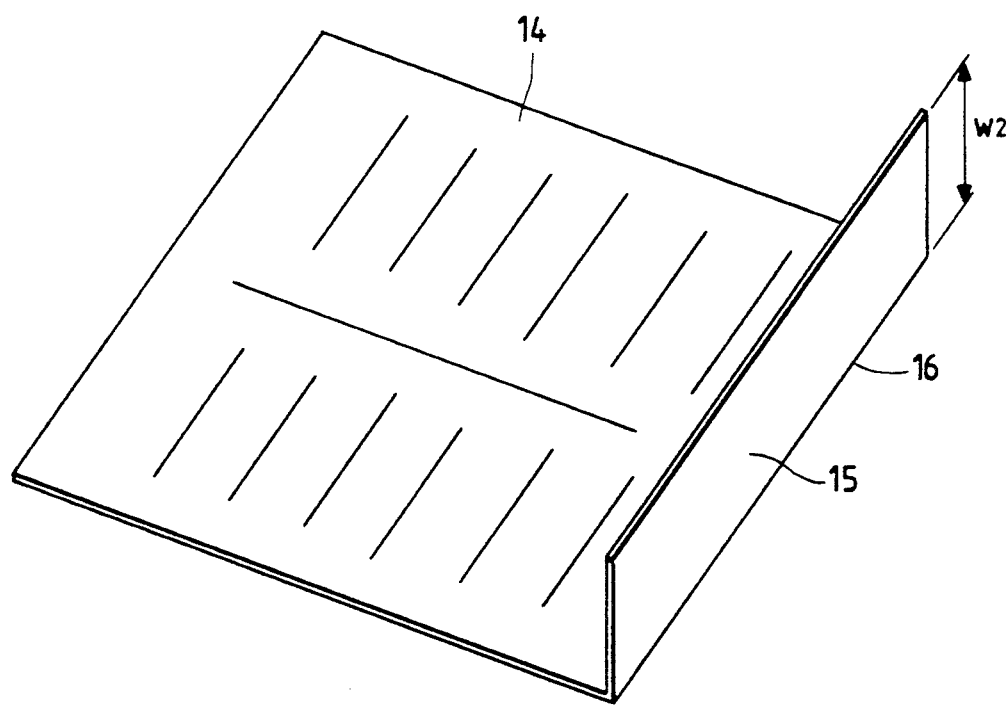
FIG. 11 is a perspective view of the index card shown in FIG. 10.

When the magnetic tape cassette 4 is inserted into the cassette storage case 3 with the second bent portion folded in an V shape as shown in FIG. 8, the magnetic tape cassette 4 thus inserted is pushed against the inner surface 3c of the top wall of the cassette storage case 3 by the elastic force of the second bent portion folded V-shaped. Therefore, the magnetic tape cassette 4 is prevented from falling out of the cassette storage case 3 unintentionally.

Thereafter, the magnetic tape cassette 4 is inserted into the cassette storage case 3 with the second bent portion flattened. Under this condition, the inserting piece 9 of the second bent portion is inserted into the gap between the inner surface of the top wall of the cassette storage case 3 and the magnetic tape cassette 4. This insertion causes the covering portion 8 to cover the opening of the cassette storage case 3.

Thus, the difficulties of dust entering the cassette storage case and the magnetic tape cassette 4 falling out of the cassette storage case 3 unintentionally can be eliminated by the invention.

The configuration of the second bent portion is not limited to that which has been described above; that is, it may be modified in various manners. For example, the above-described index card 7 may be modified in such a manner that it has no first bent portion 2; that is, the index card has the second bent portion only.

It goes without saying that the technical concept of the invention is applicable not only to the above-described cassette storage case 3, but also to cassette storage cases of other types formed, for instance, by integral molding. Furthermore, it should be noted that the invention is applicable not only to the above-described magnetic tape cassette 4, but also to cassettes of other types such as for instance a ½-inch video tape cassette.

In addition, the index card described above may be made of various materials such as paper and synthetic paper on which necessary data can be recorded with a pen or the like.

In the cassette accommodating method according to the invention, an index card is formed by a rectangular sheet material which is to be set in a book-case type cassette storage case into which a magnetic tape cassette is inserted while being moved in One direction So as to be accommodated therein. The index card has a bent portion formed so as to be brought into planar contact with the inner surface of the rear wall of the cassette storage case by bending the index card along a bending line in one end portion of the index card in such a manner that, in the direction of thickness of the cassette storage case, the height ($h_1$) of the bent portion is smaller than the height ($H_1$) of the internal space in the cassette storage case. The index card is inserted into the cassette storage case with the bent portion pushed by the magnetic tape cassette into the cassette storage case, the bent portion including the wide portion defined by the distance ($w_1$) between the bending line and the outer edge of the bent portion, which distance is larger than the height ($H_1$) of the internal space in the cassette storage case, while the magnetic tape cassette is inserted into the cassette storage case in such a manner that the wide portion is pushed against the inner wall of the rear wall of the cassette storage case by the front end of the magnetic tape cassette so as to be held bent between the inner walls of the top and bottom walls of the cassette storage case. That is, the index card is smoothly inserted into the cassette storage case because the bent portion is kept inclined. When the bent portion is brought into planar contact with the inner surface of the rear wall of the cassette storage case, it is held between the inner surfaces of the top and bottom walls of the cassette storage case by its elastic force. Hence, the difficulty of the index card falling out of the cassette storage case unintentionally can be eliminated.

Furthermore, the index card according to the invention has another bent portion which is formed by bending the other end portion of the index card in such a manner as to provide a cover with an inserting piece which is adapted to close the opening of the cassette storage case. Therefore, with the inventive index card, the opening of the cassette storage case is closed, which eliminates the difficulties of dust entering the cassette storage case and the magnetic tape cassette falling out of the cassette storage case unintentionally while being handled.

Thus, the index card according to the invention can be effectively used with the book-case type cassette storage case. The index card can be readily inserted into the cassette storage case according to the magnetic tape cassette accommodating method of the invention.

What is claimed is:

1. An index card for use with a cassette having front and rear walls defining therebetween an internal space, said internal space having a predetermined height, said index card being made of a rectangular sheet material which is to be set in a book-case type cassette storage case into which amagnetic tape cassette is inserted while being moved in one direction so as to be accommodated therein, the improvement wherein: said index card has a bent portion foremd so as to be brought into planar contact with an inner surface of said rear wall of said cassette storage case by bending said index card in such a manner that, in the direction of thickness of said cassette storage case, the height of said bent portion is smaller than the height of the internal space in said cassette storage case, said bent portion including a wide portion defined by a distance between said bending line and the outer edge of said bent portion, which distance is larger than said height of said internal space in said cassette storage case.

2. The index card as claimed in claim 1, wherein said bent portion has a plurality of protrusions formed along an end edge thereof.

3. An index card for use with a casette having front and rear walls defining therebetween an internal space, said internal space having a predetermined height, said index card being made of ar ectangular sheet material which is to be set in a bookcase type cassette storage case into which a magnetic tape cassette is inserted while being moved in one direction so as to be accommodated therein, the improvement wherein: said index card has a bent portion formed so as to be brought into planar contact with an inner surface of said rear wall of said cassette storage case by bending said index card along a bending line in one end portion of said index card along a bending line in one end portion of said index card to form an acute rise angle with an extension of the remaining portion of said index card in such a manner that, in the direction of thickness of said cassette storage case, the height of said bent portion is smaller than the height of the internal space in said cassette storage case, said bent portion including a wide portion defined by a distance between said bending line and the outer edge of said bent portion, which distance is larger than said height of said internal space in said cassette storage case.

4. The index card as claimed in claim 3, wherein said rise angle is greater than 5°.

5. The index card as claimed in claim 3, wherein said rise angle is in a range of 45° to 80°.

6. The index card as claimed in claim 3, wherein said index card has another bent portion formed by bending the other end portion of said index card in such a manner as to provide a cover with an inserting piece which closes the opening of said cassette storage case.

7. The index card as claimed in claim 3, wherein said bent portion has a plurality of protrusions formed along an end edge thereof.

8. An index card for use with a cassette having front and rear walls defining therebetween an internal space, said internal space having a predetermined height, said index card being made of a rectangular sheet material which is to be set in a bookcase type cassette storage case into which a magnetic tape cassette is inserted while being moved in one direction so as to be accommodated therein, the improvement wherein: said index card has a bent portion formed so as to be brought into planar contact with the inner surface of the rear wall of said cassette storage case by bending said index card along a bending line in one end portion of said index card to form an acute fold angle with the remaining portion of said index card in such a manner that, in the direction of thickness of said cassette storage case, the height of said bent portion is smaller than the height of the internal space in said cassette storage case, said bent portion including a wide portion defined by a distance between said bending line and the outer edge of said bent portion, which distance is larger than said height of said internal space in said cassette storage case.

9. The index card as claimed in claim 15, wherein said index card has another bent portion formed by bending the other end portion of said index card in such a manner as to provide a cover with an inserting piece which closes the opening of said cassette storage case.

10. The index card as claimed in claim 15, wherein said rise angle is greater than 5°.

11. The index card as claimed in claim 15, wherein said rise angle is in a range of 45° to 80°.

12. The index card as claimed in claim 15, wherein said bent portion has a plurality of protrusions formed along an end edge thereof.

* * * * *